Aug. 15, 1961  J. J. BOSCHERT  2,995,966
AXLE NUT TOOL
Filed Sept. 1, 1959
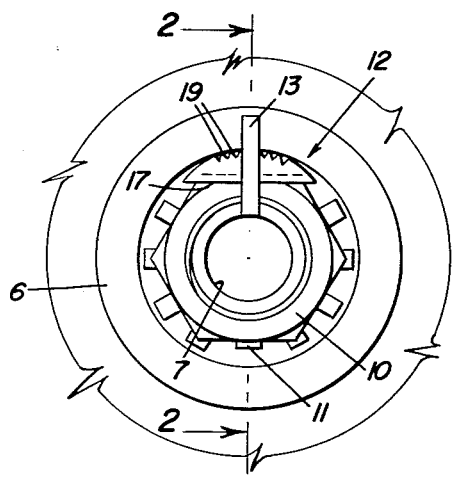
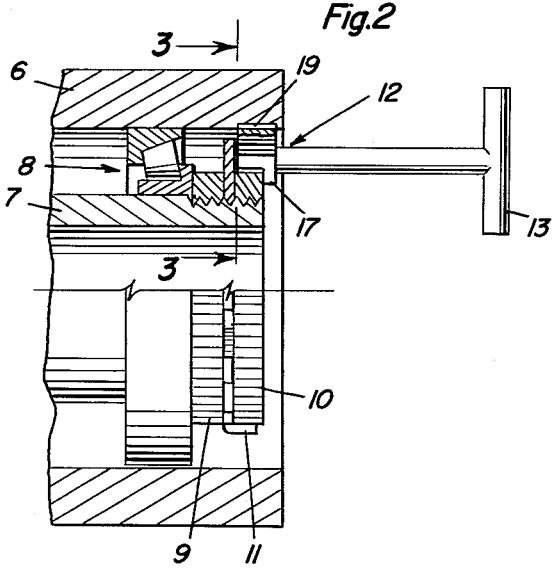
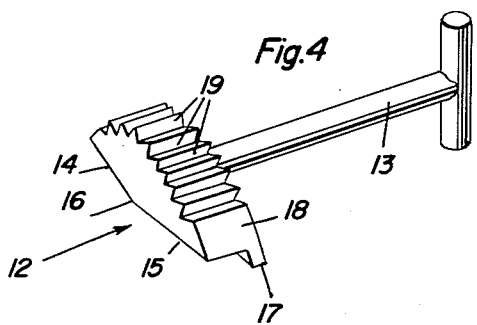
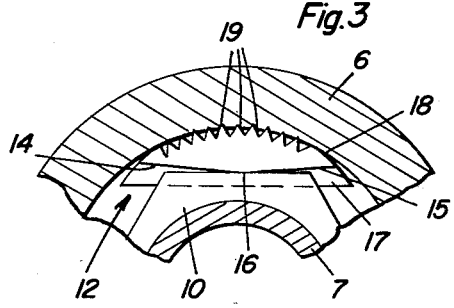
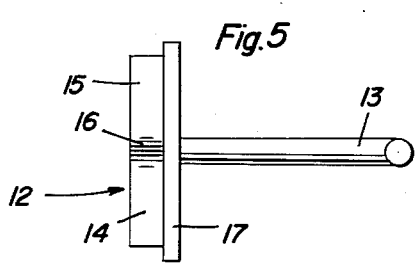
John J. Boschert
INVENTOR.

United States Patent Office 2,995,966
Patented Aug. 15, 1961

2,995,966
AXLE NUT TOOL
John J. Boschert, 819 M St., Bakersfield, Calif.
Filed Sept. 1, 1959, Ser. No. 837,377
6 Claims. (Cl. 81—76)

This invention relates generally to new and useful improvements in tools to be used particularly, although not necessarily, for mounting motor truck wheels on, or removing such wheels from, full floating axles and has for its primary object to provide, in a manner as hereinafter set forth, novel means for operatively connecting the wheel hub to the usually difficult, inaccessible bearing adjusting and lock nuts of the assembly for turning said nuts in either direction on the axle.

Another very important object of the present invention is to provide a tool of the aforementioned character which may be used readily on adjusting and lock nuts of various types and sizes within a given range.

Other objects of the invention are to provide a tool of the character described which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is an elevational view, showing a tool embodying the present invention in position for turning the lock nut of a wheel bearing assembly;

FIGURE 2 is a view in vertical longitudinal section on an enlarged scale, taken substantially on the line 2—2 of FIGURE 1;

FIGURE 3 is a fragmentary view in cross-section, taken substantially on the line 3—3 of FIGURE 2;

FIGURE 4 is a perspective view of the tool; and

FIGURE 5 is a bottom plan view thereof.

Referring now to the drawing in detail, it will be seen that reference character 6 designates the outer end portion of a conventional motor truck wheel hub. The hub 6 is journaled on the usual full floating axle 7 with an adjustable tapered roller bearing 8 therebetween. Threaded on the axle 7 is an adjusting and retaining nut 9 for the bearing 8. Also threaded on the axle 7 is a lock nut 10 for the adjusting nut 9. A conventional nut lock 11 is provided for the nut 10.

The embodiment of the present invention which has been illustrated comprises a generally segmental cam of suitable metal which is designated generally by reference character 12. The cam 12 is insertable between the hub 6 and the nut 9 or 10 to be turned, as the case may be. Toward this end, the cam 12 has affixed to the outer side thereof a T-handle 13.

The cam 12 includes a generally synclinal bottom providing oppositely inclined flats 14 and 15 with a fulcrum 16 therebetween. Depending from the outer side portion of the cam 12 is a stop flange 17 for abutting engagement with the nut to be turned. The periphery 18 of the cam 12 is provided with transverse teeth 19 for biting into the inner periphery of the hub 6.

It is thought that the use of the tool will be readily apparent from a consideration of the foregoing. Briefly, to remove the lock nut 10 for example, preparatory to demounting the wheel, the tongues of the nut lock or washer 11 are straightened or disengaged from said nut 10. Through the medium of the handle 13, the cam 12 is then inserted between the uppermost side of the nut 10 and the hub 6. The stop flange 17 engages the nut 10 and prevents the cam 12 from contacting the nut lock 11. For unscrewing the lock nut 10, the cam 12, when inserted, rests on the flat 14. With the toothed periphery of the cam 12 engaged with the inner circumference of the hub 6, the vehicle wheel is turned counterclockwise. When this occurs the cam 12 is caused to rock in an obvious manner on the fulcrum 16 toward the flat 15 thereby causing the teeth 19 to bite into the hub 6 and wedging said cam tightly between said hub and the nut 10. Thus, the nut 10 is positively locked to the hub 6 and turned in unison therewith. Of course, to tighten the nut 10 the wheel is turned in the opposite direction.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For turning a threadedly mounted nut encircled by a rotary hub, a tool comprising: a cam rockable relative to the nut and insertable between the outer periphery of the nut and the inner periphery of the hub for actuation by the latter upon rotation thereof for wedging said cam therebetween and for locking said hub and said nut together for rotation in unison, said cam being generally segmental and including a substantially synclinal bottom comprising oppositely inclined flats and a fulcrum therebetween rockable on the nut.

2. For turning a threadedly mounted nut encircled by a rotary hub, a tool comprising: a cam rockable relative to the nut and insertable between the outer periphery of the nut and the inner periphery of the hub for actuation by the latter upon rotation thereof for wedging said cam therebetween and for locking said hub and said nut together for rotation in unison, said cam being generally segmental and including peripheral teeth adapted to bite into the hub, said cam further including a substantially synclinal bottom comprising oppositely inclined flats and a fulcrum therebetween rockable on the nut.

3. For turning a nut threadedly mounted on a fixed axle and encircled by a spaced, concentric rotary wheel hub journaled on said axle, a tool comprising: a generally segmental cam, and a handle on the cam for inserting same between the hub and the nut, said cam being rockable relative to said nut and engageable with the inner periphery of the hub for actuation by the latter upon rotation thereof for turning the nut in unison therewith, said cam comprising a stop flange engageable with the nut for limiting the inserting movement of the cam, said cam further comprising a substantially synclinal bottom including oppositely inclined flats and a fulcrum therebetween operable on the nut.

4. For turning a nut threadedly mounted on a fixed axle and encircled by a spaced, concentric rotary wheel hub journaled on said axle, a tool comprising: a generally segmental cam, and a handle on the cam for inserting same between the hub and the nut, said cam being rockable relative to said nut and engageable with the inner periphery of the hub for actuation by the latter upon rotation thereof for turning the nut in unison therewith, said cam comprising a stop flange engageable with the nut for limiting the inserting movement of the cam, said cam further comprising a substantially synclinal bottom including oppositely inclined flats and a fulcrum therebetween operable on the nut, said cam still further comprising peripheral teeth for biting into the hub.

5. A tool for wedging locking engagement between adjacent surfaces of a threadedly mounted nut and an encircling rotary hub, said tool comprising a cam insertable in the area between a flat on said nut and the inner periphery of said hub, said cam including a first surface for locking frictional engagement with the inner periphery of said hub and a second surface remote from said first surface adapted for engagement with said flat, at least one cam surface extending from said second surface, said cam being rockable from a position with said second surface engaging said flat to a position with said cam surface engaging said flat and said first surface engaging the inner periphery of said hub.

6. A tool for wedging locking engagement between adjacent surfaces of a threadedly mounted nut and an encircling rotary hub, said tool comprising a body of greater length than height and of a size adapted to be snugly but loosely inserted lengthwise in the elongate area between a flat of said nut and the inner periphery of said hub, said body including a first surface for confronting said hub and a second cam surface remote from said first surface for engagement with said flat, said body being rockable on said second cam surface and about a mid-portion of said body to move said first surface into engagement with said hub, thereby locking said nut against rotation relative to the hub, said second surface including two adjacent surfaces extending longitudinally of said body and inclined relative to each other, said inclined surfaces forming an occluded angle opening toward said first surface thereby defining a fulcrum point comprising said cam surface between said inclined surfaces about which said body may be rocked in either direction corresponding to the direction of rotation of the hub whereby the leading end of the body may be engaged with the periphery of the hub and the trailing end of the body may be engaged with the flat of the nut to enable dependency of the hub to rotate relative to the nut to increase the wedging action between the body and the hub and nut thereby increasing the frictional engagement of the body with the hub and the nut.

References Cited in the file of this patent

UNITED STATES PATENTS

| | | |
|---|---|---|
| 613,613 | Warner | Nov. 1, 1898 |
| 2,477,600 | Hammond | Aug. 2, 1949 |
| 2,512,978 | Steinmann | June 27, 1950 |